(12) United States Patent
Kerdreux et al.

(10) Patent No.: US 9,084,490 B2
(45) Date of Patent: Jul. 21, 2015

(54) MAN-MACHINE INTERFACE WITH POINTER MEANS AND AN ARMREST, AND A VEHICLE

(71) Applicant: AIRBUS HELICOPTERS, Marignane, Cedex (FR)

(72) Inventors: Christelle Kerdreux, Velaux (FR); Marc Colaprisco, Gignac la Nerthe (FR); David Bardet, Salon de Provence (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 14/283,651

(22) Filed: May 21, 2014

(65) Prior Publication Data

US 2014/0353438 A1 Dec. 4, 2014

(30) Foreign Application Priority Data

May 28, 2013 (FR) ...................................... 13 01208

(51) Int. Cl.
| | |
|---|---|
| *B68G 5/00* | (2006.01) |
| *A47C 7/54* | (2006.01) |
| *B60K 35/00* | (2006.01) |
| *B60K 37/06* | (2006.01) |
| *B64D 43/00* | (2006.01) |
| *G06F 3/033* | (2013.01) |
| *G06F 3/039* | (2013.01) |

(Continued)

(52) U.S. Cl.
CPC . *A47C 7/54* (2013.01); *B60K 35/00* (2013.01); *B60K 37/06* (2013.01); *B64D 43/00* (2013.01); *G06F 3/01* (2013.01); *G06F 3/033* (2013.01); *G06F 3/039* (2013.01); *G06F 3/0488* (2013.01)

(58) Field of Classification Search
CPC .......... A47C 7/54; B60K 35/00; B60K 37/06; B64D 43/00; G06F 3/033; G06F 3/039; G06F 3/01; G06F 3/0488
See application file for complete search history.

(56) References Cited

U.S. PATENT DOCUMENTS 5,086,510 A * 2/1992 Guenther et al. .......... 455/575.9
5,161,760 A 11/1992 Terbrack (Continued)

FOREIGN PATENT DOCUMENTS

| DE | 102005033028 | 12/2006 |
|---|---|---|
| DE | 102005036624 | 2/2007 |

(Continued)

OTHER PUBLICATIONS

French Search Report for FR 1301208, Completed by the French Patent Office on Mar. 28, 2014, 7 Pages.

*Primary Examiner* — Amy Sterling
(74) *Attorney, Agent, or Firm* — Brooks Kushman P.C.

(57) ABSTRACT

A man-machine interface (10) for a vehicle (1), the interface (10) has pointer means (40) and comprises a base and a support (20) extending in elevation from said base (15). A notch (30) is formed in a side face (22) of said support (20) in an elevation direction (Z) and is shaped to match the shape of a thumb. A top face (21) of the support includes an ergonomic armrest (35) having two raised margins (36) extending symmetrically on either side of a longitudinal axis of symmetry (AX) of the armrest (35). A front face (25) of the support extends in elevation from the base (15) from a bottom portion (25') having the pointer means (40) arranged therein towards a top portion (25") that is rounded to support a user's palm.

10 Claims, 2 Drawing Sheets

(51) Int. Cl.
*G06F 3/01* (2006.01)
*G06F 3/0488* (2013.01)

(56) References Cited

U.S. PATENT DOCUMENTS

| | | | |
|---|---|---|---|
| 5,342,005 | A | 8/1994 | Szmanda et al. |
| 6,369,799 | B1 * | 4/2002 | Miceli et al. ............... 345/167 |
| 6,424,337 | B1 * | 7/2002 | Eriksson et al. ........... 345/163 |
| 6,429,852 | B1 | 8/2002 | Adams et al. |
| 6,476,794 | B1 | 11/2002 | Kataoka et al. |
| 6,593,667 | B1 * | 7/2003 | Onodera et al. ............ 307/10.1 |
| 2012/0234985 | A1 | 9/2012 | Biest et al. |

FOREIGN PATENT DOCUMENTS

| | | |
|---|---|---|
| DE | 102009008728 | 10/2009 |
| FR | 2889125 | 2/2007 |
| WO | 9509402 | 4/1995 |

\* cited by examiner

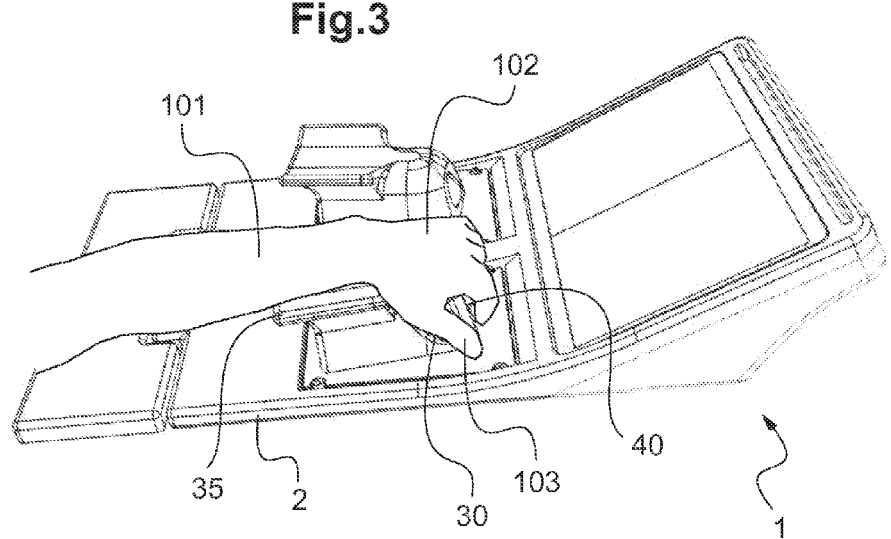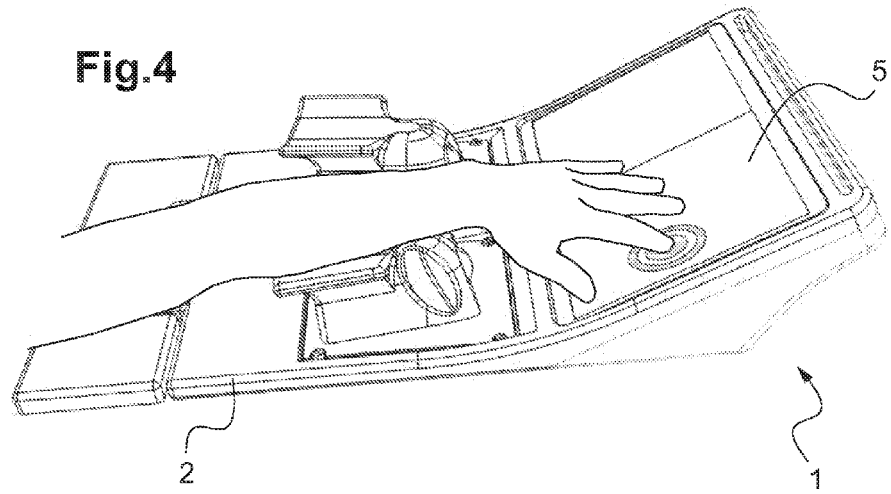

MAN-MACHINE INTERFACE WITH POINTER MEANS AND AN ARMREST, AND A VEHICLE

CROSS REFERENCE TO RELATED APPLICATION

This application claims priority to French patent application No. FR 13 01208 filed on May 28, 2013, the disclosure of which is incorporated in its entirety by reference herein.

BACKGROUND OF THE INVENTION (1) Field of the Invention

The present invention relates firstly to a man-machine interface including pointer means and an armrest, and secondly to a vehicle including the interface.

The invention lies more particularly in the technical field of man-machine interfaces for a rotorcraft, and in particular ergonomic pointer means coupled to multifunction piloting screens.

(2) Description of Related Art

The use of multifunction screens is becoming widespread in the field of aviation. A man-machine interface enables a user to use pointers on such a screen, e.g. to activate functions. Such a pointer is usually referred to as a "cursor".

The man-machine interface then has means for moving the cursor, and referred to for convenience as "pointer means". The pointer means may comprise a keypad or indeed an instrument known as a "mouse", for example. A mouse may comprise a support on which the palm of a hand rests, with movement of the mouse causing the pointer to be moved, for example.

Also known are pointer means provided with a touch zone. A user moves a finger over the touch zone in order to move a pointer on the screen. Such pointer means may be referred to as a "trackpad".

Also known are pointer means that use a movable ball that is known as a "trackball".

Nevertheless, integrating and using a screen of the above type can be awkward in an aircraft. The vibration or the movements encountered in an aircraft cockpit, and more particularly in a rotorcraft cockpit, make it difficult to manipulate a man-machine interface accurately.

Furthermore, the multifunction screen may also be a touch screen. A user may then have difficulty in moving a hand accurately between a mouse type interface, for example, and the touch screen.

Document U.S. Pat. No. 6,429,852 describes a mouse type man-machine interface. That interface comprises a support for supporting the hand of a user, the support being provided with control means that can be manipulated with the fingers of that hand.

Document U.S. Pat. No. 5,161,760 proposes a device having a pair of support members that are movable relative to a keyboard. Each support member includes a wrist support and a palm support. Furthermore, each support member is hinged to a base that receives the keyboard.

Document U.S. Pat. No. 5,342,005 describes a forearm support.

Document EP 0 721 629 presents a man-machine interface comprising firstly a palm support on which the palm of a hand can be rested, and secondly a touch zone.

Document U.S. Pat. No. 6,476,794 presents a code wheel incorporated in means on which an individual's hand can be rested.

Documents FR 2 889 125 and DE 10 2009 008728 present a code wheel secured to an armrest.

Document DE 10 2005 036624 describes an armrest fitted with a telescopic member for inputting parameters.

Document DE 10 2005 033028 describes an armrest carrying a movable panel.

Document US 2012/234985 presents a miniature cyclic stick carried by a support, the support possibly carrying an armrest.

BRIEF SUMMARY OF THE INVENTION

An object of the present invention is thus to propose a novel man-machine interface that is adapted in particular for use in an environment that is subjected to vibration, more particularly in a vehicle, and specifically an aircraft.

According to the invention, a man-machine interface for a vehicle is provided with pointer means for controlling a cursor on at least one display screen.

The man-machine interface includes a base provided with means for fastening to a console of the vehicle.

Furthermore, the man-machine interface includes a support extending in elevation from the base to a top face, the support extending transversely between two side faces and longitudinally between a rear face to a front face.

A notch is provided in at least one side face of the support in a direction in elevation, the notch being shaped to match the shape of a user's thumb.

Furthermore, the top face has an ergonomic armrest provided with two raised margins extending symmetrically on either side of a longitudinal axis of symmetry of the armrest, the two margins being arranged transversely on either side of an armrest zone extending from the rear face towards the front face, said armrest presenting a C-shaped section and being longitudinally elongate in order to match the shape of a user's forearm.

Furthermore, the front face extends in elevation from the base of a bottom portion having pointer means arranged thereon towards a top portion reaching the top face, the top portion being rounded to support a user's palm.

The top portion then constitutes a palm rest that is located in line with the armrest. Likewise, the notch runs on from the armrest in a direction going from the rear face towards the front face.

In addition, the man-machine interface may include a conventional electronic device of the pointer means for generating a control signal for the display screen. The electronic device may be arranged in the base so as to be easily connected to the display screen.

The man-machine interface may then be fastened to a console of a vehicle using the fastener means. The fastener means are conventional means, such as orifices co-operating with screws or the equivalent, for example.

A user thus places a forearm on the armrest. The raised margins hold the forearm in position transversely.

Furthermore, the user places the palm of the hand on the palm rest, with the thumb of the hand being placed in the notch.

Even if the aircraft is subjected to high levels of vibration or to sudden movements, the user's hand is held in the appropriate position relative to the pointer means. The user can then manipulate the pointer means accurately with the fingers, e.g. with an index finger.

The synergy between the armrest, the palm rest, and the position of the pointer means thus makes it possible to obtain a man-machine interface that is suitable for controlling a cursor on a display screen, with this interface remaining reliable and effective, in particular in the presence of vibration.

A button may also be arranged in the notch so as to be manipulated by the thumb. The man-machine interface may also include one or more of the following additional characteristics.

Thus, the man-machine interface may include a display screen presenting in particular the cursor that is controlled by the pointer means.

The display screen may be a touch screen. Consequently, the user may act on the information displayed either by manipulating the pointer means, or else by taking action on the display screen.

The invention makes it easy to pass from a first mode of operation involving the pointer means to a second mode of operation involving the display screen.

The synergy between the armrest, the ergonomic notch, and the palm rest makes it possible to move a user's hand accurately and easily from the pointer means to the display screen, and vice versa.

For example, after taking action directly on the display screen, the user can easily replace the hand in the appropriate position on the support for manipulating the pointer means.

In addition, the display screen may be placed in line with the longitudinal axis of symmetry of the armrest. Under such circumstances, the user can easily move the hand to the display screen.

It is simple to move the user's hand to the required position, and this may potentially be done automatically without requiring sustained attention on the part of a pilot. This characteristic is particularly advantageous in that the workload on a pilot of a vehicle is considerable.

Furthermore, the support rests on a reception face of the base, the reception face is contained in a horizontal plane, and the display screen is contained in a display plane presenting an angle of inclination lying in the range 20 degrees to 40 degrees relative to the horizontal plane.

In surprising manner, this positioning minimizes the efforts that need to be made by a user to engage with the display screen after manipulating the pointer means.

Furthermore, the support rests on a reception face of the base, the reception face is contained in a horizontal plane, and the bottom portion may be perpendicular to the horizontal plane.

This position optimizes the positioning of the hand on the support by placing the hand in a position that a person finds natural. This facilitates manipulating the pointer means. Furthermore, this comfortable position tends to minimize the effects of vehicle vibration on manipulating the pointer means.

The pointer means may comprise at least one of the following means: a trackpad type touch zone; a trackball type movable ball; a trackwheel type wheel; or indeed selector means that may be activated by pressure from a user's finger, such as a button.

The invention also provides a vehicle provided with a console. Then vehicle then includes at least one man-machine interface of the above-described type, the base being fastened to the console. Likewise, a display screen may be fastened to the console.

More particularly, such a vehicle may be an aircraft.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which:

FIG. 3 is a view of a man-machine interface showing a user acting on the pointer means; and FIG. 4 is a view of a man-machine interface showing a user acting on a display screen.

Elements present in more than one of the figures are given the same references in each of them.

DETAILED DESCRIPTION OF THE INVENTION

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Y.

Figure 1:
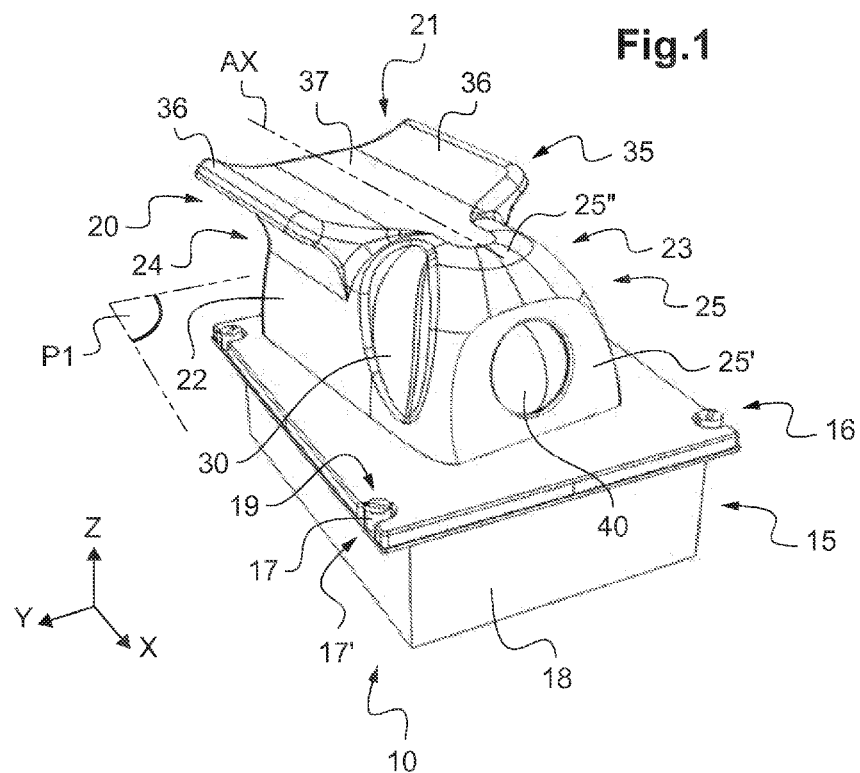
FIG. 1 is a view of a man-machine interface of the invention.

FIG. 1 shows a man-machine interface 10 of the invention.

This man-machine interface 10 comprises a base 15 carrying a support 20.

The base 15 may comprise a box 18 having a reception face 19. The reception face 19 projects from the periphery of the box 18 so as to present a rim that can be fastened to a console by fastener means 16. For example, the fastener means 16 include orifices 17' passing through the base 15 and screws 17 suitable for passing through the orifices 17'.

The box may be hollow in order to receive an electronic device therein, such as an electronic device for pointer means 40 of the man-machine interface 10.

The support 20 extends from the reception face 19 in a direction Z in elevation up to a top face 21. Furthermore, the support 20 extends transversely between a left side face 23 and a right side face 22, and longitudinally from a rear face 24 to a front face 25.

The support is thus generally in the form of a rectangular parallelepiped.

The top face 21 of the support 20 has an armrest 35 on which an individual can place a forearm.

The armrest 35 is provided with two margins 36 that are arranged symmetrically and transversely on either side of an axis of symmetry AX of the armrest. This axis of symmetry AX extends in a longitudinal direction.

Consequently, the armrest 35 has a zone 37 referred to as the "armrest zone" extending along the axis of symmetry AX between the margins 36.

The armrest zone 37 is relatively plane, whereas the margins 36 are raised so as to move away in elevation from the plane containing the armrest zone 37. These characteristics confer an elongate C-shape to the armrest.

The armrest 35 is then shaped to match the shape of a forearm so as to enable an individual to lodge a forearm in the support.

In addition, the support 20 includes at least one notch 30 for receiving a user's thumb. The notch 30 is situated in front of the armrest 35 in a direction going from the rear face towards the front face.

Each notch 30 is formed in a side face and extends in an elevation direction of the space towards the top face. The support 20 may then have a single notch formed in one side face. In another variant, the support 20 has two notches formed respectively in the left and right side faces so as to be symmetrical in order to enable it to be installed equally well on the left or on the right of a seat.

Furthermore, the support 20 has a palm rest and pointer means 40 in front of the armrest 35 in a direction going from the rear face towards the front face.

More precisely, the front face 25 is provided in an elevation direction with a bottom portion 25' resting on the reception face 19 followed by a top portion 25".

Under such circumstances, the bottom portion may be orthogonal to a horizontal plane P1 containing the reception face 19. The pointer means 40 are then arranged on this bottom portion 25'. Depending on the nature of the pointer means, the bottom portion may present some other angle relative to the horizontal plane P1.

The pointer means may comprise a movable ball as in the example shown. In a variant or in addition, the pointer means may include a touch zone, a wheel, or indeed button-type selector means, for example.

The pointer means are connected to an electronic device arranged within the support or the base. By way of example, it should be observed that the support may be pivotally mounted or that it may include pivotal portions to give access to the electronic device.

As a result of an individual moving the pointer means, the electronic device generates an order that is transmitted to a display screen, e.g. for the purpose of moving a cursor.

Figure 2:
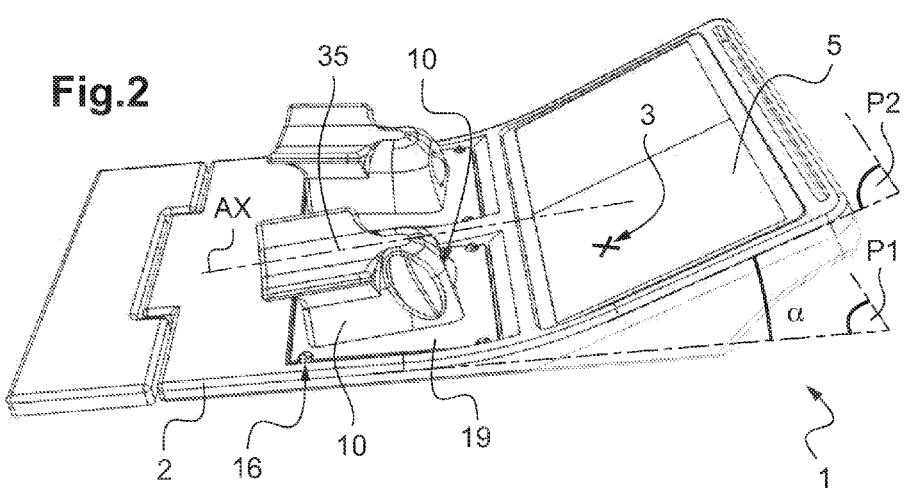
FIG. 2 is a view of a man-machine interface of the invention fastened to a console.

FIG. 2 shows a vehicle 1 of the invention. The vehicle is thus provided with at least one man-machine interface 10 for controlling a cursor 3 of at least one display screen 5.

The man-machine interface 10 is fastened to a console 2.

Thus, the base 15 of each interface is received in a housing in the console 2 and is then fastened to the console by fastener means.

Likewise, the display screen 5 is fastened to the console 2 in line with the axis of symmetry AX of the associated armrest 35. The display screen 5 is advantageously contained in a display plane P2 presenting an angle of inclination α lying in the range 20 degrees to 40 degrees relative to the horizontal plane P1 defined by the reception face 19.

With reference to FIG. 3, an individual then places a forearm 101 on the armrest 35. In order to actuate the pointer means 40, the individual presses the palm 102 of the hand on the top portion 25" of the front face 25 and places the thumb in the notch 30. The individual can then easily move the pointer means with the fingers other than the thumb.

With reference to FIG. 4, and by way of example, when the display screen 5 is a touch screen, the individual can move the hand forward to interact with the display screen.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A man-machine interface for a vehicle, said man-machine interface being provided with pointer means for controlling a cursor on at least one display screen and comprising:
    a base provided with fastener means for fastening to a console of said vehicle; and
    a support extending in elevation from said base to a top face, said support extending transversely between two side faces and longitudinally between a rear face to a front face, a notch being provided in at least one side face of said support in an elevation direction (Z) and being shaped to match the shape of a user's thumb, said top face having an ergonomic armrest provided with two raised margins extending symmetrically on either side of a longitudinal axis of symmetry (AX) of the armrest, said two margins being arranged transversely on either side of an armrest zone extending from the rear face towards the front face, said armrest presenting a C-shaped section and being longitudinally elongate in order to match the shape of a user's forearm, said front face extending in elevation from the base of a bottom portion having pointer means arranged thereon towards a top portion reaching the top face, the top portion being rounded to support a user's palm.

2. A man-machine interface according to claim 1, wherein said man-machine interface includes said display screen, said display screen being placed in line with said longitudinal axis of symmetry of the armrest.

3. A man-machine interface according to claim 1, wherein said support rests on a reception face of said base, said reception face is contained in a horizontal plane (P1), and said display screen is contained in a display plane (P2) presenting an angle of inclination lying in the range 20 degrees to 40 degrees relative to the horizontal plane (P1).

4. A man-machine interface according to claim 1, wherein said support rests on a reception face of said base, said reception face is contained in a horizontal plane (P1), and said bottom portion is perpendicular to said horizontal plane (P1).

5. A man-machine interface according to claim 1, wherein said display screen is a touch screen.

6. A man-machine interface according to claim 1, wherein said pointer means comprise a touch zone.

7. A man-machine interface according to claim 1, wherein said pointer means comprise a movable ball.

8. A man-machine interface according to claim 1, wherein said pointer means comprise a wheel.

9. A man-machine interface according to claim 1, wherein said pointer means comprise selector means capable of being activated by pressure from a user's finger.

10. A man-machine interface according to claim 1, wherein said base is fastened to said vehicle console.

\* \* \* \* \*